(12) United States Patent
Wang et al.

(10) Patent No.: US 8,630,222 B2
(45) Date of Patent: Jan. 14, 2014

(54) DELAY-CONSTRAINED AND ENERGY-EFFICIENT ONLINE ROUTING FOR ASYNCHRONOUS SENSOR NETWORKS

(75) Inventors: Xinguo Wang, Hefei (CN); Qian Zhang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 384 days.

(21) Appl. No.: 13/034,573

(22) Filed: Feb. 24, 2011

(65) Prior Publication Data

US 2012/0218926 A1 Aug. 30, 2012

(51) Int. Cl.
H04W 4/00 (2009.01)
H04J 1/10 (2006.01)
H04J 3/08 (2006.01)

(52) U.S. Cl.
USPC .......................................................... 370/315

(58) Field of Classification Search
None
See application file for complete search history.

(56) References Cited

U.S. PATENT DOCUMENTS

2009/0059827 A1* 3/2009 Liu et al. .................... 370/311

OTHER PUBLICATIONS

S. Tan, J. Ma, M. Chen, and L. Hu, Energy-Efficient Geographic Routing in Asynchronous Wireless Sensor Networks, 2010 12th IEEE International Conference on Communication Technology, Nov. 14, 2010, pp. 1117-1120.*
A. Rao, S. Ratnasamy, C. Papadimitriou, S. Shenker, I. Stoica, Geographic Routing without Location Information, Proceedings of MobiCom 2003, Sep. 19, 2003, pp. 96-108.*
Y. Sun, O. Gurewitz, D. Johnson, RI-MAC: A Receiver-Initiated Asynchronous Duty Cycle MAC Protocol for Dynamic Traffic Loads in Wireless Sensor Networks, Proceedings of SenSys 2008, Nov. 7, 2008, pp. 1-14.*
P. Dutta, S. Dawson-Haggerty, Y. Chen, C. Liang, and A. Terzis, Design and Evaluation of a Versatile and Efficient Receiver-Initiated Link Layer for Low-Power Wireless, SenSys 2010, Nov. 5, 2010, pp. 1-14.*
H. She, Z. Lu, A. Jantsch, D. Zhou, and L. Zheng, Analytical Evaluation of Retransmission Schemes in Wireless Sensor Networks, Proceedings of the IEEE 69th Vehicular Technology Conference, Apr. 29, 2009, pp. 1-5.*

(Continued)

Primary Examiner — John Blanton
Assistant Examiner — Christopher Crutchfield
(74) Attorney, Agent, or Firm — Leydig, Voit & Mayer, Ltd.

(57) ABSTRACT

The described method and system provide an efficient routing of data packets protocol in an event-driven and delay-constrained WSN (wireless sensor network) that optimizes the sleep/wake schedule of nodes to maximize the lifetime of the WSM, subject to a constraint on the source-to-sink delay. Online forwarding techniques may be used to transfer data reports from monitoring nodes to the sink. A delay-constrained and energy-efficient routing protocol (DCEER) for asynchronous WSNs may be used to maximize the lifetime of the WSN while remaining within the maximum allowable delay requirements. With DCEER, each node may maintain the historical cost of forwarding a packet from itself to the sink as its virtual coordinate, and packets are forwarded in the direction of descending coordinates. The cost-based coordinates may change dynamically with a time-varying channel or topology. Nodes may apply a relay-selection scheme to choose a next-hop relay from a set of multiple potential relay candidates, based on a tradeoff between forwarding energy consumption (FEC) and waiting costs. The optimal stopping time for the relay-selection process may be determined based on expected forwarding and waiting costs, and the nodes may operate according to an optimal sleep/wake schedule based on waiting costs and expected traffic flow.

20 Claims, 10 Drawing Sheets

(56) References Cited

OTHER PUBLICATIONS

Y. Wang, D. Wang, W. Fu, and D. Agrawal, Hops-based Sleep Scheduling Algorithm for Enhancing Lifetime of Wireless Sensor Networks, 2006 IEEE International Conference on Mobile Adhoc and Sensor Systems (MASS), Oct. 2006, pp. 709-714.*

J. Kim, X. Lin, N. Schroff, P. Sinha, Minimizing Delay and Maximizing Lifetime for Wireless Sensor Networks with Anycast, IEEE/ACM Transactions on Networking, vol. 18, issue 2, Apr. 2010, pp. 515-528.*

Anonymous, "CC100 Single Chip Very Low Power RF Receiver," Chipcon Products from Texas Instruments (product data sheet), Revision SWRS048A (Jan. 2007).

Buettner et al., "X-MAC: a short preamble MAC protocol for duty-cycled wireless sensor networks," in Proc. of the 4th ACM Conference on Embedded Sensor Systems (SenSys), 307-320 (2006).

Caruso et al., "GPS free coordinate assignment and routing in wireless sensor networks," in Proc. of the 24th IEEE INFOCOM, 150-150 (2005).

Casari et al., "Efficient Non-Planar Routing around Dead Ends in Sparse Topologies using Random Forwarding," in Proc. IEEE International Conference on Communications (ICC'07), 3122-3129 (2007).

Crossbow Technology Inc., Logistics Products (http://www.xbow.com) (undated).

Fang et al., "Glider: Gradient landmark-based distributed routing for sensor networks," in Proc. of the 24th IEEE INFOCOM (Mar. 2005).

Ferrara et. al., "Macro: An Integrated MAC/Routing Protocol for Geographical Forwarding in Wireless Sensor Networks," in Proc. of the 24th IEEE INFOCOM (Mar. 2005).

IEEE Computer Society, "Standard for Information technology—Telecommunications and information exchange between systems—Local and metropolitan area networks—Specific requirements. Part 15.4: Wireless Medium Access Control (MAC) and Physical Layer (PHY) Specifications for Low-Rate Wireless Personal Area Networks (WPANs)," IEEE Std 802.15.4™—Revision of IEEE Std 802.15.4-2003) (2006).

Karp et al., "GPSR: Greedy perimeter stateless routing for wireless networks," in Proc. of the 6th ACM/IEEE MOBICOM, 243-254 (2000).

Kim et al., "On maximizing the lifetime of delay-sensitive wireless sensor networks with anycast," in Proc. of the 27th IEEE INFOCOM (2008).

Kim et al., "Optimal anycast technique for delay-sensitive energy-constrained asynchronous sensor networks," in Proc. of the 28th IEEE INFOCOM (2009).

Kulkarni et al., "An Address-light, Integrated MAC and Routing Protocol for Wireless Sensor Networks," IEEE/ACM Transactions on Networking, 14 (4): 793-806 (Aug. 2006).

Polastre et al., "Versatile low power media access for wireless sensor networks," in Proc. of the 2nd ACM Conference on Embedded Networked Sensor Systems (SenSys), 95-107 (Nov. 2004).

Stojmenovic et al., "Power-aware localized routing in wireless network," IEEE Transactions on Parallel and Distributed Systems, 12 (11): 1122-1133 (Nov. 2001).

Sun et al., "RI-MAC: A receiver initiated asynchronous duty cycle MAC protocol for dynamic traffic load," in Proc of the 6th ACM Conference on Embedded Networked Sensor Systems (SenSys) (Nov. 2008).

Sun et al., "RI-MAC: A Receiver-Initiated Asynchronous Duty Cycle MAC Protocol for Dynamic Traffic Loads in Wireless Sensor Networks," SenSys'08 (Nov. 5-7, 2008, Raleigh, North Carolina, U.S.A.).

Takagi et al., "Optimal transmission ranges for randomly distributed packet radio terminals," IEEE Transactions on Communications, 32 (3): 246-257 (1984).

Van Dam et al., "An adaptive energy efficient mac protocol for wireless sensor networks," in 1st ACM Conference on Embedded Networked Sensor Systems (SenSys), 171-180 (2003).

Ye et al., "An energy efficient mac protocol for wireless sensor networks," in Proc. of the 21st IEEE INFOCOM (2002).

Zuniga et al., "Analyzing the transitional region in low power wireless links," in Proc. of IEEE SECON (2004).

Waharte et al., "Routing protocols in wireless mesh networks: challenges and design considerations," Multimed Tools Appl, Jul. 6, 2006, Springer Science + Business Media, LLC, New York, New York.

Chipcon Inc. CC1000 Single Chip Very Low Power RF Transceiver, data sheet, 2007.

Crossbow, Technology Inc., Logistics Products, Mica2 Mote, Jun. 2007.

802.15.4 in the Context of Zigbee—MAC Layer, Institute of Electric and Electronics Engineers, 2006.

* cited by examiner (a) $N(231.16, 324.25)$      (b) $N(2.32, 0.26)$ (a) Large packet scenario    (b) Small packet scenario (a) Large packet scenario (b) Small packet scenario (a) Large packet scenario	(b) Small packet scenario

DELAY-CONSTRAINED AND ENERGY-EFFICIENT ONLINE ROUTING FOR ASYNCHRONOUS SENSOR NETWORKS

BACKGROUND OF THE INVENTION

In the protocols designed for wireless sensor networks (WSNs), energy-efficiency is a critical concern because sensor nodes are typically battery powered and expected to survive as long as possible. The end-to-end delay is also crucial to the success of time-sensitive applications, such as, for example, fire alarm and intrusion detection systems, where obsolete data is useless and may even be harmful. Thus, both energy-efficiency and end-to-end delay are important considerations when designing protocols for time-sensitive wireless sensor networks [1] (see Table 1 below for full citation).

Conventional media access control (MAC) protocols with sleep/wake schedules can be roughly categorized into synchronized and asynchronous protocols, according to the schedule pattern. In synchronized protocols [2], [3], nodes in the neighboring area periodically exchange synchronization messages with each other and operate their schedules at the same pace. However, periodic message exchanges incur an additional communications burden, consuming a considerable amount of energy. If sensor nodes are idle most of time, keeping them synchronized is inefficient. In asynchronous protocols, except for the sink, all nodes sleep and wake up independently. Due to the lack of the knowledge regarding each other's schedules, a sender has to wait for a receiver to wake up before transmitting data packets.

In B-MAC [4], a sender precedes the data packet with a preamble that is slightly longer than the sleep interval of a receiver. When a node wakes up and detects the preamble, it waits for the end of the preamble and prepares to receive the subsequent data packet if it is the destination. In X-MAC [5], a sender transmits a series of short preambles separated by intervals, including the address of the receiver, to awaken a target receiver. When the receiver wakes up and receives a preamble, it replies with a message during the interval to notify the sender it is waking up and prepares to receive data packets. In RI-MAC [6], instead of transmitting preambles to awaken the receiver, a sender silently waits for a waking-up notification from a receiver, which occupies less channel time.

In geographic routing, a sender selects a next-hop relay based on the location of the sender, its one-hop neighbors, and the destination. In one conventional system [7], each sender chooses the neighbor that is closest to the destination as the next-hop relay, while the sender in another conventional system [8] prefers the neighbor with the shortest projected distance. Some other recent conventional protocols assign a hop-based coordinate to each node to support online forwarding in the absence of geographic location. In Gradient Landmark-based Distributed Routing (GLIDER) [9] for sensor networks, some nodes are selected as anchor nodes and other nodes maintain a vector of hop count distances to each anchor node. Packets are forwarded to the neighbor that has the minimum Hamming distance to the destination. The efficiency of GLIDER depends on whether a good set of anchor nodes are selected. VCap [10] also assigns virtual coordinates to each node and shows that the performance of online forwarding with the virtual coordinate system is slightly below the performance with physical locations when the node density is high enough. These conventional systems were aimed at finding a global shortest forwarding path, which is also deemed the minimum energy path under the assumption of the unit disk model. However, recent experimental studies [11] have shown that unit disk model is fundamentally impractical and the energy consumed by transmission depends not only on the distance between the sender and receiver, but also on some random environmental factors.

Existing cross-layer solutions also fail to make a good tradeoff between energy-efficiency and delay in asynchronous networks. In an "integrated MAC/Routing protocol" (MACRO) [12], the sender tries different transmitting power levels to seek the next-hop relay with the maximal geographical progress per unit of transmitting power. This search may result in unacceptable end-to-end delays and considerable energy costs, especially in low duty cycle networks where nodes wake up very infrequently. It has been pointed out in [13] that it is not clear whether anycast forwarding will minimize the actual end-to-end delay, which depends on not only the single-hop delay but also the forwarding path. In [13], optimal anycast forwarding and sleep/wake schedule policies are proposed to minimize the end-to-end delay, but the impact of an asynchronous sleep/wake schedule on energy-efficiency is not considered.

In [14], the joint control problem of how to optimally control the sleep/wake schedule, the anycast candidate set of next-hop neighbors, and anycast priorities to maximize the lifetime of event-driven networks subject to a constraint on the expected end-to-end delay was studied. However, the priority matrix of [14] is seldom applicable since the probability that multiple candidates wake up at the same beacon interval is very low, especially in low duty cycle networks.

Recent cross-layer works [13], [14], [15] for event-driven and asynchronous networks have usually assumed that data reports are very rare and small in size. Then, they simply ignore the energy consumed by forwarding packets and mainly consider how to control sleep/wake schedules to make a good tradeoff between the energy consumed by sleep/wake schedules and the forwarding delay. However, packet forwarding may consume considerable energy even in event-driven networks, especially when packets are large in size.

In MAC protocols designed for WSNs, sleep/wake schedules are widely employed to reduce idle listening and energy consumption. In asynchronous sleep/wake schedule protocols [4], [5], [6], each node operates its sleep/wake schedule independently. A non-sender node just periodically wakes up for a short period to check whether another node is preparing to send packet to it. However, a sender is required to stay active and wait for a receiver or receivers to wake up, due to the lack of knowledge regarding the schedule of the receiver or receivers. For event-driven networks, it has been demonstrated that asynchronous schedule protocols consume less energy than synchronized ones. In addition, asynchronous schedule protocols are easier to implement.

Online forwarding techniques may be used to transfer data reports from monitoring nodes to the sink. In online forwarding protocols [10], [15], [16], [17], the forwarding path is selected locally and without using routing tables.

Below is a table of references cited in the Background, all of which are incorporated herein in their entireties by reference.

TABLE 1

Bibliography

[1] S. Waharte, R. Boutaba, Y. Iraqi, and B. Ishibashi, "Routing protocols in wireless mesh networks: challenges and design considerations," Multimedia Tools Appl., vol. 29, no. 3, pp. 285-303, 2006.
[2] W. Ye, J. Heidemann, and D. Estrin, "An energy efficient mac protocol for wireless sensor networks," in Proc. of the 21st IEEE INFOCOM, 2002.
[3] T. van Dam and K. Langendoen, "An adaptive energy efficient mac protocol for wireless sensor networks," in 1st ACM Conference on Embedded Networked Sensor Systems (SenSys), pages 171-180, 2003.
[4] J. Polastre, J. Hill, and D. Culler, "Versatile low power media access for wireless sensor networks," in Proc of the 2nd ACM Conference on Embedded Networked Sensor Systems (SenSys), pages 95-107, November 2004.
[5] M. Buettner, G. Yee, E. Anderson and R. Han, "X-MAC: a short preamble MAC protocol for duty-cycled wireless sensor networks," in Proc. of the 4th ACM Conference on Embedded Sensor Systems (SenSys), 2006, pp. 307-320.
[6] Y. Sun, O. Gurewitz, and D. B. Johnson, "RI-MAC: A receiver initiated asynchronous duty cycle MAC protocol for dynamic traffic load," in Proc of the 6th ACM Conference on Embedded Networked Sensor Systems (SenSys), November 2008.
[7] B. Karp and H. T. Kung, "GPSR: Greedy perimeter stateless routing for wireless networks," in Proc. of the 6th ACM/IEEE MOBICOM, 2000, pp. 243-254.
[8] H. Takagi and L. Kleinrock, "Optimal transmission ranges for randomly distributed packet radio terminals," IEEE Transactions on Communications, vol. 32, no. 3, pp. 246-257, 1984.
[9] Q. Fang, J. Gao, L. Guibas, V. de Silva, and L. Zhang, "GLIDER: Gradient landmark-based distributed routing for sensor networks," in Proc. of the 24th IEEE INFOCOM, March 2005.
[10] A. Caruso, S. Chessa, S. De, and A. Urpi, "GPS free coordinate assignment and routing in wireless sensor networks," in Proc. Of the 24th IEEE INFOCOM, 2005.
[11] M. Zuniga and B. Krishnamachari, "Analyzing the transitional region in low power wireless links," in Proc. of IEEE SECON, 2004.
[12] D. Ferrara, et. al., "MACRO: An Integrated MAC/Routing Protocol for Geographical Forwarding in Wireless Sensor Networks," in Proc. of the 24th IEEE INFOCOM, March 2005.
[13] J. Kim, X. Lin, and N. B. Shroff, "Optimal anycast technique for delay-sensitive energy-constrained asynchronous sensor networks," in Proc. of the 28th IEEE INFOCOM, 2009.
[14] J. Kim, X. Lin, N. B. Shroff, and P. Sinha, "On maximizing the lifetime of delay-sensitive wireless sensor networks with anycast," in Proc. of the 27th IEEE INFOCOM, 2008.
[15] S. Kulkarni, A. Iyer and C. Rosenberg, "An address-light, integrated MAC and routing protocol for wireless sensor networks," IEEE/ACM Transactions on Networking, vol. 14, no. 4, pp. 793-806, August 2006.
[16] P. Casari, M. Nati, C. Petrioli, and M. Zorzi, "Efficient non-planar routing around dead ends in sparse topologies using random forwarding," in Proc. of IEEE International Conference on Communications, 2007.
[17] I. Stojmenovic and X. Lin, "Power-aware localized routing in wireless network," IEEE Transactions on Parallel and Distributed Systems, vol. 12, no. 11, pp. 1122-1133, November 2001.

BRIEF SUMMARY OF THE INVENTION

The invention provides an efficient system and method for implementing an asynchronous routing protocol in a WSN that optimizes the sleep/wake schedule of nodes to maximize the lifetime of the WSM, subject to a constraint on the source-to-sink delay. A rendezvous scheme similar to that of a RI-MAC routing protocol scheme may be used, and contrary to previous works, packet size is not assumed to be small, providing a more practical energy consumption model that jointly optimizes the relay selection process and the sleep/wake schedule of nodes.

In one preferred embodiment, the WSN is an event-driven and delay-constrained network, where sensor nodes are idle at most of time but must forward data reports to the sink within a maximum allowable delay after detecting a critical event. Online forwarding techniques may be used to transfer data reports from monitoring nodes to the sink. An online forwarding scheme may be advantageous because it reduces the cost of route discovery and the burden of maintaining large-scale routing tables. Furthermore, online forwarding protocols may be able adapt to dynamic situations (e.g. with a time-varying channel, node mobility sleep/wake schedule, etc.) very well.

A delay-constrained and energy-efficient routing protocol (DCEER) for asynchronous WSNs may be used to maximize the lifetime of the WSN while remaining within the maximum allowable delay requirements. With DCEER, each node may maintain the historical cost of forwarding a packet from itself to the sink as its virtual coordinate, and packets are forwarded in the direction of descending coordinates (i.e. towards nodes with lower historical costs of node-to-sink forwarding). The cost-based coordinates may change dynamically with a time-varying channel or topology.

When holding a packet to send, a node may wait for its relay candidates (one-hop neighbors with lower coordinates) to wake up and may select the best relay, taking both the coordinates and the cost of waiting into account. A candidate-initiated scheme may be used to establish rendezvous between the sender and its relay candidates. In this scheme, each non-sender node broadcasts a short message immediately after waking up, notifying neighboring senders of its current cost coordinate, while the sender waits for notifications silently. After receiving a notification from a candidate, the sender may estimate the total forwarding energy consumption (FEC) that would result if the sender were to choose that candidate. If the sender continues to wait for more notifications, it may possible for the sender to find a candidate with a lower FEC, but the sender would also incur additional waiting costs in the process. Thus, the relay selection protocol should account for the tradeoff between known FEC(s) and potential waiting costs. The potential waiting cost may be unknown because the wake-up time and cost coordinates of other potential relay candidates may be unknown. In further embodiments, the routing protocol may include processes that provide more reliable forwarding (e.g. handling timeout or route discovery problems) and that deal with possible packet losses.

In one embodiment, the DCEER may determine an optimal stopping time which minimizes the sum of the FEC and waiting cost, subject to the constraint on source-to-sink delay, through formulation of the dynamic relay selection as a Markov decision problem. The size of the packets which are to be forwarded according to the DCEER may affect the relay selection process. For a large packet, it may be relatively more efficient for a sender to wait longer to find a relay candidate with a lower FEC. For a small packet, it may be relatively more efficient to stop the waiting process as soon as possible to reduce the waiting cost.

As with other asynchronous networks, sleep intervals of nodes may affect the energy-efficiency and delay associated with routing protocols for a WSN. A longer sleep interval allows a node to wake up less frequently and consume less energy, but may result in another node, which may be holding a packet to be sent, suffering a longer waiting time and cause the WSN to consume more energy overall than if the WSN had had a shorter sleep interval. In a further embodiment, the sleep/wake schedule of each node in an asynchronous WSN following a DCEER may be optimized according to the node's unique traffic and the delay constraint, such that energy depletion may be minimized and the network lifetime maximized.

BRIEF DESCRIPTION OF THE SEVERAL VIEWS OF THE DRAWING(S)

DETAILED DESCRIPTION OF THE INVENTION

Table of Contents

I. System Model
   A. Link Model
   B. Forwarding Cost and Virtual Coordinate
II. Cross-Layer Routing
   A. Rendezvous Scheme and Relay Selection
   B. Reliable Forwarding
   C. Packet Loss Recovery
III. Optimal Stopping Time
IV. Optimal Sleep/Wake Schedule
V. Simulation
   A. Parameter Setting
   B. Simulation Results
VI. Conclusion

I. System Model

Figure 1:
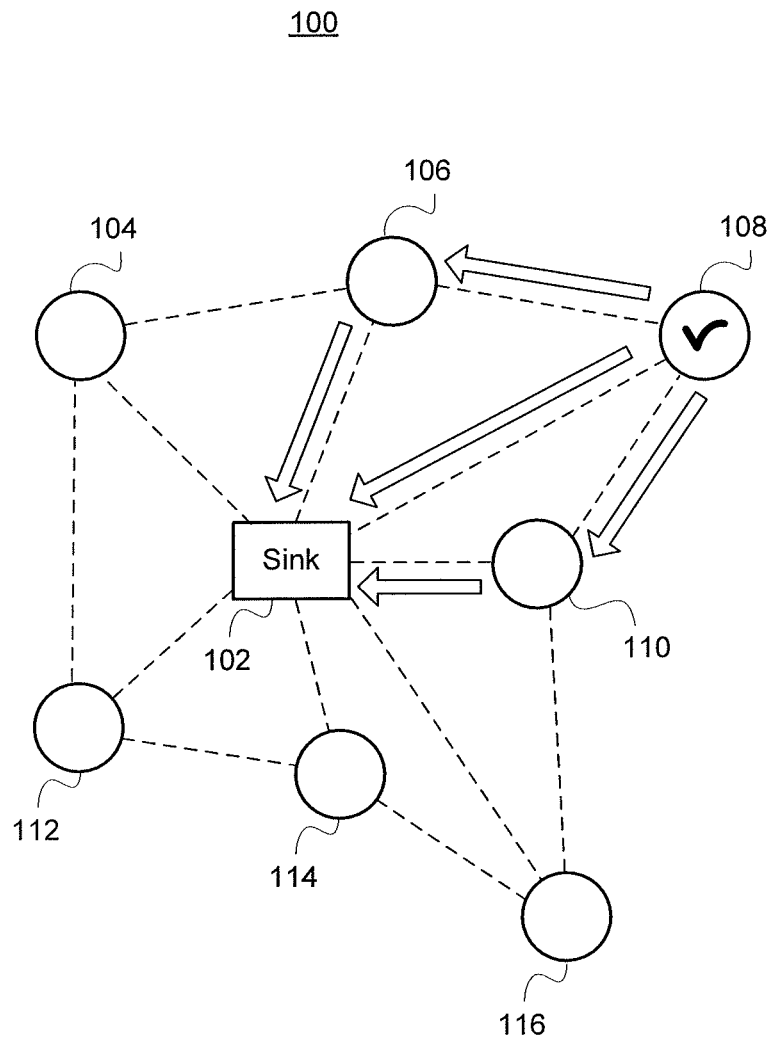
FIG. 1 is a schematic diagram of a representative part of an exemplary WSN in accordance with an embodiment of the described principles.

FIG. 1 depicts a representative part of an exemplary WSN 100 in one embodiment, wherein the WSN may be an event-driven and delay-constrained network where generation of data packets may be triggered by randomly occurring events and should preferably be forwarded to the sink 102 within a maximum allowable delay. For example, if sensor node 108 detects the occurrence of an event and generates a data packet, it may be possible for sensor node 108 to forward the data packet to the sink through node 106, forward the data packet directly to the sink, or forward the data packet to the sink through node 110 as depicted in FIG. 1. Sensor nodes 104, 106, 108, 110, 112, 114, 116 may be distributed over an entire monitoring area, and although not shown in FIG. 1, the nodes may be uniformly distributed with node density $\lambda n$. The nodes may be able to send packets to each other and the sink, and it will be appreciated that the lines depicted in FIG. 1 are merely exemplary and not intended to be a limitation on the available channels through which a packet may be forwarded.

To focus on the routing problem, it may be assumed that there is a redundancy elimination mechanism among neighboring nodes, which can prevent an event from triggering a large-scale data burst. Specifically, each node may generate a data packet with an interval $t_{event}$, a random period exponentially distributed with parameter $\lambda e$. Except for the sink, each node may be battery-powered and employ an independent sleep/wake schedule to save energy. Specifically, when a node has no packet to send, it may wake up for a period of $t_{check}$ to check whether any node is preparing to send packet to it, and it may otherwise sleep for $t_{sleep}$. $t_{check}$ may be a short constant period and $t_{sleep}$ may be a random period exponentially distributed with parameter $\lambda s$. $t_{sleep}$ may be much longer than in order to sustain long-term monitoring on limited energy resources for each node.

Figure 2:
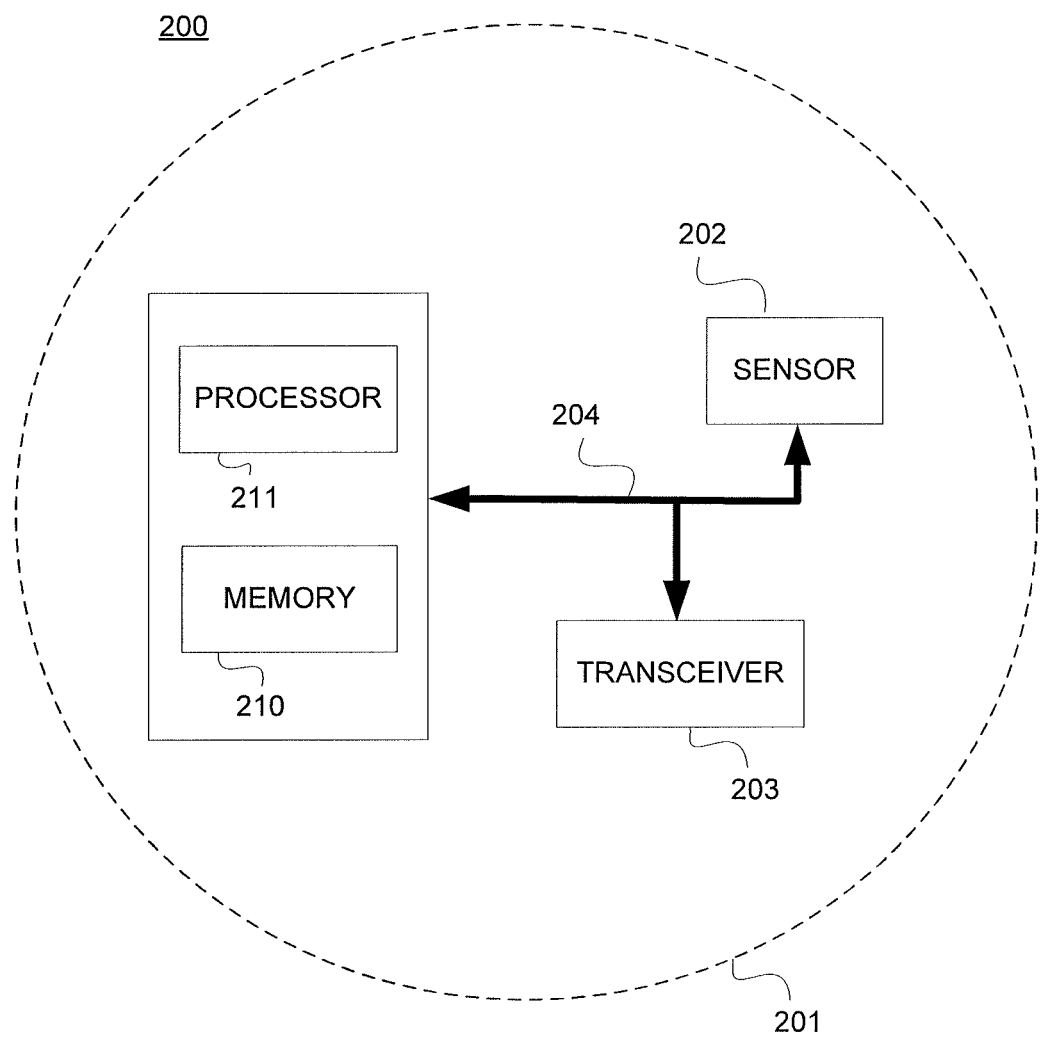
FIG. 2 is a schematic diagram of the components of an exemplary sensor node in a WSN in accordance with an embodiment of the described principles.

FIG. 2 is a schematic 200 that depicts the components of an exemplary sensor node within a WSN in one embodiment. A sensor node 201 may include one or more sensors 202 and a transceiver 203 in communication with a processor 211 and memory 210 via, for example, a system bus 204. The memory 210 may be a tangible, non-transient computer readable memory, (e.g. RAM, ROM, PROM, volatile, nonvolatile, or other electronic memory mechanism) with computer-executable instructions and appropriate applications for executing those instructions stored on it. The instructions may include, for example, instructions for operating the nodes according to a sleep/wake schedule for the sensor node and instructions for forwarding data packets generated by the sensor detecting the occurrence of an event according to a routing protocol. The processor 211 may execute the applications and run the instructions stored on the memory 210 as appropriate such that, for example, when a sensor 202 detects the occurrence of an event, a data packet may be generated and sent towards a sink using the transceiver 203, and such that, for example, when the transceiver 203 receives a forwarded data packet from another node, the sensor node 201 may forward the packet towards the sink in accordance with an appropriate routing protocol. The transceiver 203 may communicate with the transceivers of other nodes or the sink, and the transceiver 203 may receive or send data packets in accordance with the instructions on the memory 210 as executed by the processor 211.

It will be appreciated that the WSN of FIG. 1 and the components depicted in FIG. 2 are merely exemplary and the invention is not limited to the embodiments of a WSN depicted by FIGS. 1 and 2. For example, a further embodiment of a WSN may include nodes that do not have sensors and only include appropriate components for routing packets. In another example, a further embodiment of a WSN may include sensor nodes where the sensors are connected to additional hardware to communicate wirelessly with a processor and transceiver rather than through a system bus. It will further be appreciated that an exemplary sink of a WSN may comprise a processor, memory, and transceiver similar to the components described with respect to FIG. 2 and may be capable of receiving and storing data packets forwarded to the sink from sensor nodes.

A. Link Model

A log-normal shadowing path loss model, as described with further detail in Theodore S. Rappaport, "Wireless Communications: Principles and Practice," *Prentice Hall*, which is incorporated herein by reference in its entirety, may be used, which presents two consequences for a factual decaying signal. First, the signal strength decays exponentially with respect to distance. In addition, the signal strength is randomly distributed about the mean distance-dependent value. This signal propagation model may be given by $$PL(d)=PL(d_0)+10n \log_{10}(d/d_0)+X_\sigma, d \geq d_0,$$

where d is the distance between the transmitter and receiver, $d_0$ a reference distance, n the path loss exponent, and $X_\sigma$ a zero-mean Guassian random variable (in dB) with standard deviation $\sigma$, respectively. The received signal strength at the receiver is the output power of the transmitter minus PL(d). To simulate the time-varying feature of the factual channel, an additional assumption that $X_\sigma$ remains invariable during $t_{link}$, a random period exponentially distributed with parameter $\lambda_\sigma$, may be made.

The packet reception ratio depends on the signal to interference plus noise ratio (SINR) at the receiver. The following empirical packet reception ratio model, derived in Institute of Electric and Electronic Engineers (IEEE), IEEE 802.15.4 Std., 2006, which is incorporated herein by reference in its entirety, may be used, and the impacts of neighborhood interference on packet reception may be ignored since the collision probability of multiple data flows is very low in event-driven networks:

$$PRR = \left[1 - \frac{8}{15} \times \frac{1}{16} \times \sum_{k=2}^{16} (-1)^k C_k^{16} e^{20 \times \gamma(d) \times (\frac{1}{k}-1)}\right]^{8F},$$

where $\gamma(d)$ is the signal to noise ratio (in dB) and F the frame length of the packet (in bytes), respectively.

Since asynchronous sleep/wake schedule may incur additional delay, the link delay may be defined as $$T^l = t_{wait}^l + N_{tx}^l (t_l + t_b + t_c + t_{data} + t_{ack}),$$

where $t_{wait}^l$ wait is the delay incurred by waiting for the suitable receiver to wake up, $N_{tx}^l$ is the transmission times and equal to [PRR$^{-1}$], $t_l$ the listening time to assess the channel is busy or idle, $t_b$ the back-off time to prevent nodes from attempting to transmit at the same time after finding the channel is idle, $t_c$ the time to transmit control packets, $t_{data}$ the data transmission delay, $t_{ack}$ the time to reply ACK (acknowledgement) packet. In general, $t_{wait}^l$ and $t_{data}$ are expected to be longer than $t_l$, $t_b$, $t_c$, and $t_{ack}$. Hence, the link delay may be estimated as $$T^l \approx t_{wait}^l + N_{tx}^l t_{data}.$$

If the data packet is smaller than a certain threshold (e.g., 60 bytes), $N_{tx}^l t_{data}$ can be omitted further, as in [13], [14], [15]. Likewise, rendezvous establishment and data packet delivery account for the major part of energy consumption, which may be estimated as $$E^l \approx E_{wait}^l + E_{tx-rx},$$

where $E_{wait}^l$ is the energy part incurred by establishing rendezvous between the sender and receiver and equal to $P_{wait} \cdot t_{wait}^l$. $P_{wait}$ is the waiting cost per unit time. $E_{tx-rx}^l$ is the energy part incurred by transmitting and receiving data packet, approximately equal to $P_{tx-rx}^l t_{data}$. $P_{tx-rx}^l$ may be given by $$P_{tx-rx}^l = N_{tx}^l \cdot \left(\frac{P_{tx}}{\eta(P_{tx})} + P_{rx}\right), \quad (1)$$

where $P_{tx}$ is the output power of the transmitter, $\eta$ the power conversion efficiency of the power amplifier, and $P_{rx}$ the power in the receive mode, respectively. If the receiver is the sink, $P_{rx}$ may be omitted since the sink has enough energy.

It may be assumed that each sensor node may choose the transmission power $P_{tx}$ dynamically from available power levels $\{P_1, P_2, \ldots, P_{mg}\}$, which is supported by most conventional low-cost and low-power radio chips. In addition, the energy consumption and delay incurred by switching transmission power levels may be ignored. To minimize $E_{tx-rx}^l$, each sender may adjust its transmission power level according to the current link quality, which can be obtained after collecting the recent signal strength values at the receiver.

B. Forwarding Cost and Virtual Coordinate

In addition to maintaining the minimum hop count to the sink, each node may maintain a triplet of forwarding costs, which are the total expected number of transmissions, the total expected transmitting-receiving power consumption and the total expected waiting delay, along the forwarding path from itself to the sink, denoted by $<N_{tx}^p, P_{tx-rx}^p, T_{wait}^p>$. The upper suffix 'p' is used to indicate the expected path cost of forwarding a packet from a node to the sink while the upper suffix 'l' is used to indicate the link cost from a node to its next-hop relay as above.

These forwarding path costs may be updated constantly along with the time-varying link qualities. A hop-by-hop forwarding-driven updating mechanism may be used, without introducing additional communication overhead. For convenience of description, $C^p$ may uniformly represent $N_{tx}^p$, $P_{tx-rx}^P$, and $T_{wait}^P$. In addition, node s may represent a generic data sender. After forwarding a data packet to the next-hop relay r, sender s may update its forwarding costs according to the following formula:

$$C^p(s)=\alpha(C^l(s,r)+C^p(r))+1-\alpha C^p(s), \quad (2)$$

where $C^l(s, r)$ refers to $N_{tx}^l$, $P_{tx-rx}^l$, $T_{wait}^l$ of the link from s to r correspondingly, $C^l(s, r)+C^p(r)$ is deemed as the recent path cost of forwarding a packet to the sink via node r and $\alpha$ is the updating speed factor, depending on how dynamic the network is and how often it forwards a packet. $C^p(r)$ is obtained from received piggy-back control messages when establishing rendezvous with node r. The detailed rendezvous scheme will be discussed further below.

A node may estimate the forwarding energy consumption from itself to the sink as its coordinate, which is given by $$E^p=P_{wait}T_{wait}^p+P_{tx-rx}t_{data}.$$

This coordinate may depend on both $<N_{tx}^P, P_{tx-rx}^P, T_{wait}^P>$ and data packet size. Online forwarding techniques may be applied based on the coordinates of the nodes, where the next-hop relay is selected locally and the data packet is forwarded towards the direction of descending hop count and $E^p$ repeatedly until it arrives at the sink. After receiving the current $C^p$ of node r, sender s may compute the expected energy consumption $E^p(r)$ and then make routing decisions.

The relay candidate set for node s may be defined as:

$$F_s=\{r \in N_s | h(r)=h(s)-1 \text{ and } E^p(r)<E^p(s)\},$$

where Ns denotes the neighbor set of node s.

Sender s may select the best relay from all awake candidates by comparing the following metric, FEC, $$E_r^p(s)=E_{tx-rx}^l(s,r)+E^p(r). \quad (3)$$

$E_r^p(s)$ is the total expected energy consumption incurred by forwarding the current packet from s to the sink if node r is selected as the next-hop relay. Since node r is already been awake at this point, $E_r^p(s)$ does not include the energy consumed by waiting for r to wake up. In online forwarding protocols, a packet is forwarded hop-by-hop and the next-hop relay is decided at each hop dynamically. When sender s selects the next-hop relay, it does not know which node the selected next-hop relay will select as the next next-hop relay for the current packet. Hence, the sender s may use $E^p(r)$ to estimate the energy consumption from node r to the sink when evaluating the quality of node r.

Figure 3:
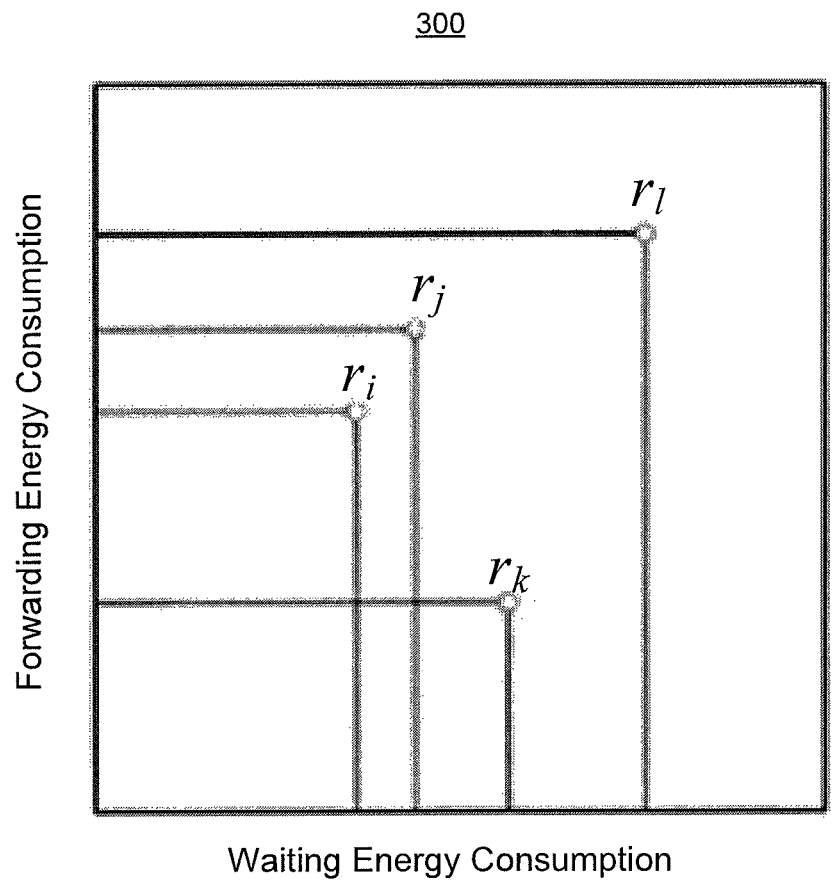
FIG. 3 is a graph depicting an example of the tradeoff between FEC and waiting energy consumption for potential relay candidates in accordance with an embodiment of the described principles.

However, the energy that may be consumed by sender s while waiting for node r to wake up should also be taken into account when making routing decisions. Thus, the waking-up time of a candidate may be another determinant factor. FIG. 3 is a graph 300 depicting an example of the tradeoff between FEC and waiting energy consumption given potential relay candidates $r_i$, $r_j$, $r_k$, and $r_l$ for a sender and the FEC and waiting costs associated with each potential relay candidate. In this example, $r_k$ may be the best candidate (with the lowest combined FEC and waiting cost), but before $r_k$ actually wakes up and communicates with the sender, the sender may not be aware that $r_k$ is the best candidate. This illustrates that during the relay selection process, the sender may be required to make a decision regarding an optimal tradeoff between choosing a known relay candidate or incurring additional waiting cost to try and find a relay with lower FEC to minimize the overall energy consumed without knowing how much additional waiting cost will be incurred and without knowing the FEC of other potential relay candidates. An additional consideration is the total end-to-end delay, and the triplet of forwarding costs $<N_{tx}^P, P_{tx-rx}^P, T_{wait}^P>$ may be used to estimate the end-to-end delay and control the relay selection duration at each hop to meet the overall delay constraint, which will be discussed further below.

II. Cross Layer Routing

Cross-layer relay selection may be used to improve the performance of online forwarding when running over asynchronous MAC protocol. Specifically, an integrated cross-layer solution of online forwarding and asynchronous MAC based on virtual coordinates as defined above may be used. Each node may decide the next-hop relay dynamically while waiting for relay candidates to wake up, taking into account waiting cost and FEC jointly, with the objective of minimizing the total energy consumption incurred by forwarding a packet from a node to the sink, subject to a constraint on the source-to-sink delay. One skilled in the art will appreciate that the principles described herein relating to a cross-layer solution may easily be transplanted to other online routing protocols where the underlying MAC employs an asynchronous sleep/wake schedule. For example, a geographic cross-layer protocol may make a tradeoff between the waiting cost and geographic progress at each hop.

Specifically, a cross-layer solution for maximizing the lifetime of the WSN while remaining within the maximum allowable delay requirements may be the DCEER for asynchronous WSNs. The following considerations with respect to the DCEER will be discussed further below: efficiently establishing rendezvous between a sender and its candidates; efficiently completing the relay selection and recovering from potential failures; and dealing with and assessing the potential impact of packet loss.

A. Rendezvous Scheme and Relay Selection

Figure 4:
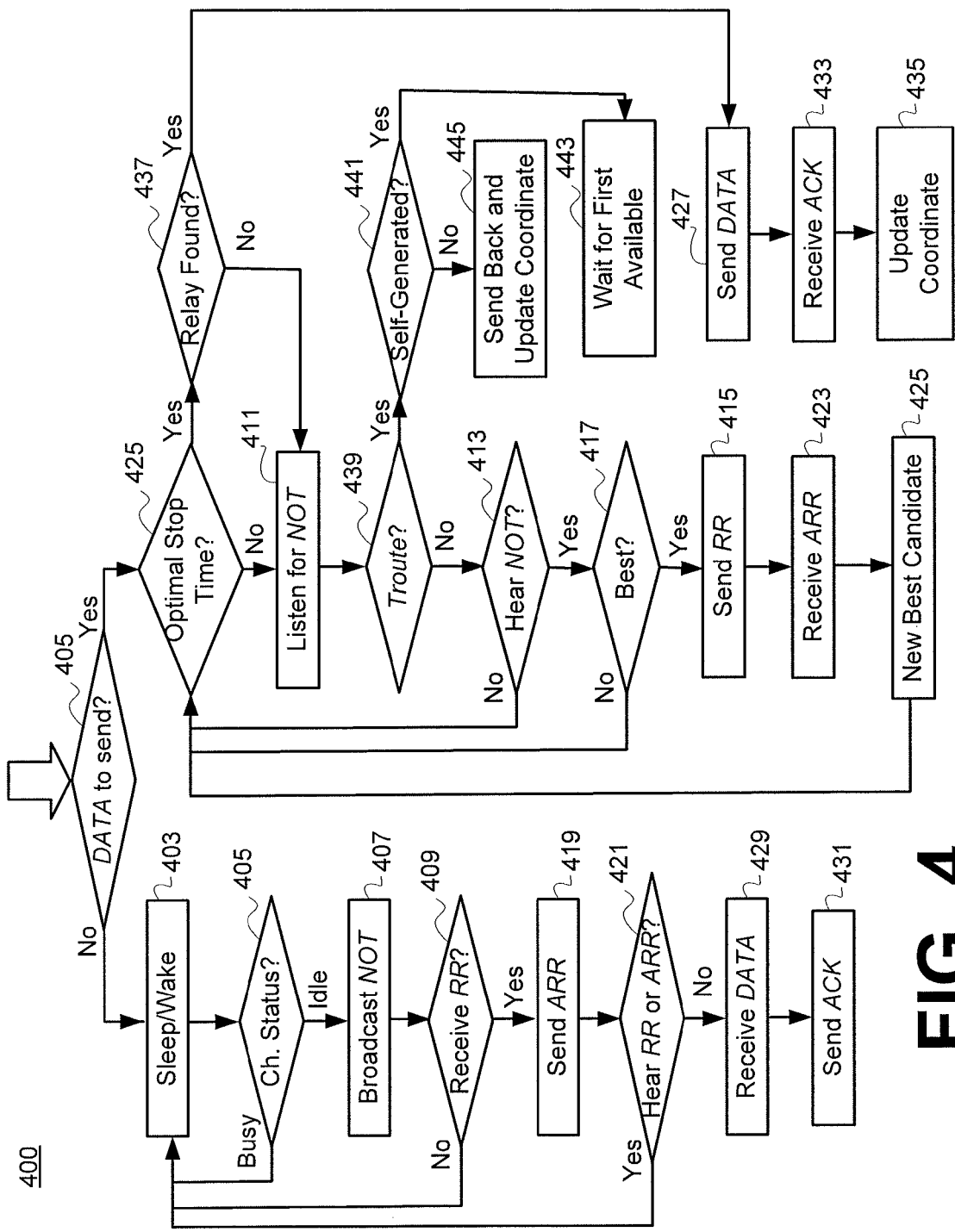
FIG. 4 is a flowchart illustrating a process for forwarding data packets within a WSN in accordance with an embodiment of the described principles.

Turning to FIG. 4, a process for forwarding data packets within a WSN in one embodiment is depicted. The behavior of a node may depend on whether the node is holding a data packet (DATA packet) to send 401. When a node has no data packet to send, it may alternately sleep for a period of $t_{sleep}$ and wake up for a period of $t_{check}$ 403. This sleep/wake schedule 403 may be optimized as described further below. After waking up, the node may immediately assess the channel status 405. If the channel is idle, it may broadcast 407 a short NOT packet, which may include its current $P_{tx-rx}^P$ fit $T_{wait}^P$, to notify neighboring potential senders that it is waking up, and then it may wait for a relay request (RR) 409 from neighboring senders. Since event-driven networks are not generating any packets most of time, $t_{check}$ may be designed to be just slightly longer than the shortest time needed to transmit a NOT packet and receive a relay request from a neighboring sender to reduce the energy consumption of non-sender node. If no relay request is received during $t_{check}$ 409, the non-sender node may go back to sleep immediately. If the channel is busy during $t_{check}$, the node may not broadcast a NOT packet during $t_{check}$ and may go back to sleep 405.

A sender node may stay in listen mode and wait for NOT packets 411 from its neighbors silently. After receiving a NOT packet 413, the sender may determine whether the neighbor that sent the NOT packet is a qualified candidate by comparing its Ep and hop count with the neighbor. The sender may transmit a RR after receiving a NOT from a qualified candidate 415, which may be transmitted immediately when the neighbor has a sho short $t_{check}$ period. Neighboring nodes may establish a rendezvous point in this manner when a node has a packet to forward. This candidate-initiated rendezvous scheme may be more efficient because it occupies the channel less than sender-initiated asynchronous rendezvous schemes.

The sender node may select the current-best among all awake candidates when waiting for the next candidate to wake up. After receiving a NOT packet from a relay candidate r, sender s may select r as the current-best relay candidate 425 if it is the first candidate or better than the previous current-best 417. If sender s determines that node r would be the current-best relay candidate 417, sender s may broadcast a RR packet immediately 415, and the RR packet may include the node ID (identifier) of r, such that node r may be able to recognize that the RR packet is intended for node r. After receiving a RR, node r may reply to sender s with an ARR (acknowledgement for relay request) packet 419, 423, including the node ID of s. Then, node r may wait in listen mode until sender s finds a better relay candidate or stops the relay selection 421. The previous current-best candidate may quit the relay selection and go to sleep if it overhears a new RR packet broadcasted from (or if it overhears an ARR packet broadcasted from a different relay candidate including the node ID of s—see discussion of packet loss below), which may indicate to the previous current-best candidate that sender s has found a new current-best candidate 421, 425. If sender s finds a different candidate (i.e. sender s receives another NOT packet from a different candidate) that is not better than the current-best, it may keep silent (i.e. does not send an RR with the ID of the different candidate) and the different candidate may go back to sleep when its $t_{check}$ ends 409. In general, only one node may be selected as the current-best candidate and stays in listen mode during relay selection. When sender s stops the relay selection, the current-best candidate at the end of relay selection "wins" the round of relay selection and is selected as the next hop relay.

Figure 5:
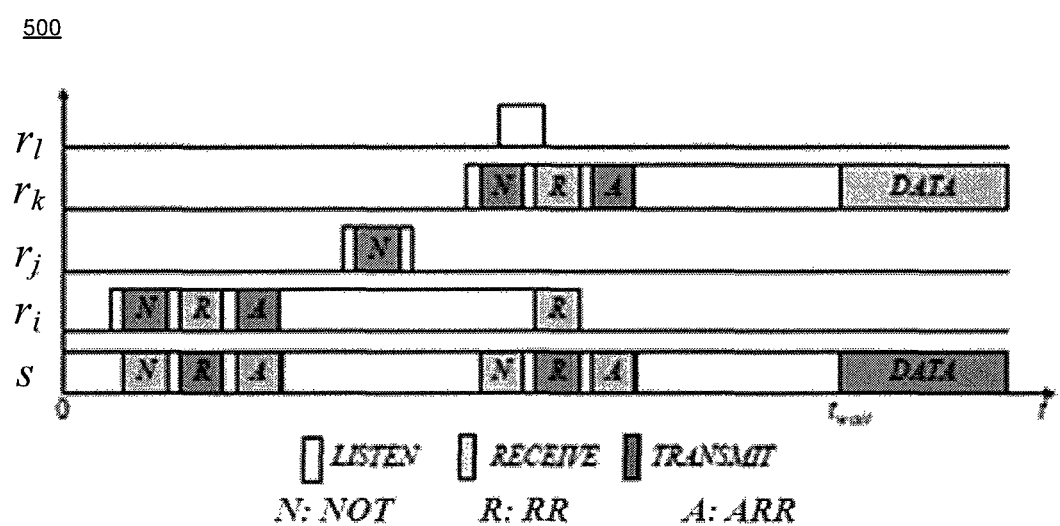
FIG. 5 is a timeline illustrating exemplary interactions between a sender node and potential relay nodes during a relay selection process in accordance with an embodiment of the described principles.

FIG. 5 illustrates a simple relay selection example 500. Node $r_i$ wakes up first and is requested to remain awake until a better candidate $r_k$ wakes up. Before $r_k$, sender s receives a NOT packet from $r_j$ but makes no response since $r_j$ is not better than the current-best candidate $r^i$. Sender s decides to stop waiting at $t_{wait}$, which is an optimal stopping time (determination of the optimal stopping time is discussed further below), and $r_k$ wins this round of relay selection. Node $r_l$ wakes up but does not broadcast a NOT packet because the channel is busy when $r_l$ wakes up.

B. Reliable Forwarding

Turning back to FIG. 4, once the sender decides to stop the relay selection, which may occur at an optimal stopping time 425 as discussed further below, it may transmit a DATA packet 427, 429 to the selected relay directly when the channel becomes idle. Then, the relay may reply with an ACK packet 431, 433, including the average signal strength when receiving the DATA packet, which may be used by sender to estimate $P_{tx-rx}^l$. After receiving the ACK packet successfully 433, sender s may update its virtual coordinate 435 according to Eq. (2) above and go back to sleep. Meanwhile, the relay may become the sender of the next hop and may continue to forward the received DATA packet ahead. This process may be repeated until the DATA packet is delivered to the sink successfully.

It may be possible that some senders might not be able to find any qualified candidates within Troute due to coordinate error or packet loss 437, 439, where Troute is the maximum waiting time and a candidate is expected to wake up at least once within Troute with high probability. In a further embodiment, this kind of route failure may be handled according to the source of the DATA packet 441. If the packet is generated by the sensor node itself 441, the sender may select the neighbor that wakes up first as the relay during route rediscovery, regardless of its coordinate 443. Otherwise, the sender may forward the packet back to the previous hop node 445. After a successful route rediscovery, the sender may update its coordinate 445 using $\alpha=1$. By doing so, this sender may obtain a larger coordinate and hop count than the selected relay (i.e. the previous hop node), which may help prevent subsequent packets from flowing from the selected relay to this sender in the short term.

C. Packet Loss Recovery

Packets may be lost in transmission due to channel error or multi-hop collision. In further embodiments of the present invention, the DCEER may include procedures for dealing with packet losses. Generally speaking, packet losses seldom affect the performance of DCEER.

A DATA or ACK packet loss may trigger the retransmission of the unacknowledged DATA packet directly. If the number of DATA packet retransmissions resulting in failure (i.e. unacknowledged transmissions) reaches the maximum value Nretry, the sender may initiate a new round of route discovery to try another relay.

A NOT packet loss may make the sender miss a forwarding choice for one round of relay selection, but it does not necessarily affect the forwarding performance since the missed relay candidate would not necessarily have won the relay selection. Thus, while it may be possible to add a detection and recovery scheme for the loss of a NOT packet, it is not necessary as loss of a NOT packet seldom affects forwarding performance.

A RR or ARR packet loss may result in a sender not receiving an ARR packet within a certain time as expected by the sender after sending a RR packet. The requested relay node may also not reply with an ARR to a sender if it had already approved the request of another sender earlier. Thus, the sender may not be able to determine whether an ARR timeout was caused by a RR or ARR packet loss or the relay node being preoccupied with another request. The sender may try to deal with this situation by retransmitting the RR packet. If the requested relay node has already gone back to sleep (due to loss of the first RR packet) or if the requested relay node is preoccupied with another request, the sender may still not receive an ARR packet from the requested relay node even with retransmission of the RR packet. Therefore, in one embodiment, the sender may only rebroadcast the same RR packet once before moving on with the relay selection process. In the situation where two successive ARR packets are lost, there may be a requested relay node that mistakenly believes itself to be the current-best candidate while the sender has moved on with the relay selection process, but in this situation the mistaken requested relay node may go to sleep immediately after overhearing a RR (or ARR) packet from the sender (or the real current-best candidate).

In a further embodiment, the previous best candidate may only go back to sleep if it hears an ARR packet with the node ID of the sender, and not when it hears a new RR packet broadcasted from s (see 421 of FIG. 4). This may prevent a situation where a sender sends an RR to a potential receiver candidate that is busy, and the previous-best candidate goes back to sleep after overhearing the RR, leaving the sender with no previous-best candidate.

III. Optimal Stopping Time

The optimal stopping time of the relay selection in one embodiment may be determined as follows. A sender s may begin the relay selection at time t=0 and may need to decide when to stop the relay selection. The sender s may have N relay candidates in total, and these candidates may have the same sleep interval parameter $\lambda s$. The interval between two candidates waking up successively may be exponentially distributed with the parameter $N\lambda s$. In addition, the forwarding energy consumption via these different candidates may be independent and identically distributed random measures with distribution function F(.). A stochastic process X(t) may be interpreted as the energy consumption of forwarding the packet to the sink via the current-best relay candidate at time t, where X(t) is given by $$X(t)=\min\{E_{r_i}^P(s); i=1,2,\ldots,N(t)\},$$

where N(t) is the number of relay candidates that wake up during [0, t]. $\{X(t), t \geq 0\}$ is a strong Markov process. The return from stopping time t (i.e. the cost of stopping at time t) is given by $X(t)+P_{wait}t$, where $P_{wait}$ is the waiting power cost per unit time and approximately equal to $2P_{idle}$, the power cost incurred by keeping the sender and current-best relay candidate in the listen mode when waiting for the next relay candidate.

Before proceeding to optimization of energy consumption, the value of X(0) may also be considered. If the relay selection is stopped at time 0, there are no available candidates and the sender may have to transmit the packet to the sink directly. X(0) may be assumed to be so large that the sender must wait for at least one candidate to wake up.

Hence, to find an optimal stopping time of relay selection in order to minimize the total energy consumption, the follow equation may be used:

$$\Psi_T = E[X(T) + P_{wait}T], \quad (4)$$

where T is a stopping time. The expected forwarding energy consumption at stopping time T may be given by:

$$E[X(T)] = X(0) + N\lambda_s E[\int_0^T G(X(t))dt],$$

where $$G(x) = \int_0^x (y-x)dF(y).$$

Then, it follows that the total expected energy consumption at stopping time T may be given by $$\Psi_T = X(0) + E[\int_0^T [N\lambda_s G(X(t)) + P_{wait}]dt]. \quad (5)$$

G may be convex, non-positive, continuous and strictly decreasing. Then, if $G(X(0)) \leq -P_{wait}/N\lambda_s$, the function equation $$N\lambda_s G(x) + P_{wait} = 0 \quad (6)$$

may have a unique solution. Note that if it is assumed that X(0) is much larger than all forwarding costs, the situation where $G(X(0)) > -P_{wait}N\lambda_s$ may not occur, since $G(X(0)) > -P_{wait}/N\lambda_s$ implies that the expected energy saving brought by waiting for the ATA first relay candidate is less than the corresponding waiting energy consumption.

The optimal stopping time $T_{wait}^{opt}$ which minimizes $\Psi_T$ may be defined as follows:

$$T_{wait}^{opt} = \inf\{t \geq 0; X(t) \leq \xi\} \quad (7)$$

where $\xi$ is the unique solution for Eq. (6) above.

Since $N\lambda_s G(x) + P_{wait}$ is strictly decreasing in x and X(t) is non-increasing in t, it follows that $$N\lambda_s G(X(t)) + P_{wait} \leq N\lambda_s G(X)(t+\Delta t)) + P_{wait}$$

for any positive $\Delta t$. Using the definition of $T_{wait}^{opt}$, the following equation may be obtained:

$$N\lambda_s G(X(t)) + P_{wait} < 0, \text{if and only if } t < T_{wait}^{opt},$$

which, together with Eq. (5), establishes the optimality of $T_{wait}^{opt}$.

The number of NOT packets needed until $X(t) \leq \xi$ possesses the geometric distribution with parameter $F(\xi)$. Since the expected interval time between two successive NOT packets is $1/N\lambda_s$, the following equations may be obtained:

$$E[T_{wait}^{opt}] = \frac{1}{N\lambda_s F(\xi)}, \quad (8)$$

and $$\Psi_{T_{wait}^{opt}} = \int_0^\xi \frac{x}{F(\xi)} dF(x) + \frac{P_{wait}}{N\lambda_s F(\xi)} \quad (9)$$

$$= \frac{G(\xi) + P_{wait}/N\lambda_s}{F(\xi)} + \int_0^\xi \frac{\xi}{F(\xi)} dF(x)$$

$$= \xi.$$

The optimal stopping rule $\{X(T_{wait}^{opt}) \leq \xi\}$ has a simple practical meaning. It may be rewritten as:

$$\int_0^{X(T_{wait}^{opt})} [X(T_{wait}^{opt}) - x] dF(x) \leq \frac{P_{wait}}{N\lambda_s}.$$

The left part of the non-equality denotes the expected decrement of X(T) brought by the next candidate and the right part denotes the expected energy cost of waiting for the next candidate to wake up. The time to stop continuing to wait for the next candidate to wake up may be determined as the time when the expected forwarding energy decrement is less than the waiting energy consumption.

In addition, the stopping time of the relay selection may be restricted by the requirement that the expected end-to-end delay should not exceed the maximum allowable value. The upper bound of route discovery time at sender s may be expressed as:

$$\tau_{wait}(s) = \tau - t^p(src,s) - t^p(s),$$

where $\tau$ is the upper bound of the source-to-sink delay, $t^p(src, s)$ is the time elapsed along the path from the event source to sender s, which is cumulated in a field of DATA packet header, and $t^p(s)$ is the expected delay between node s and the sink, which is given by $T_{wait}^P(s) + N_{tx}^P(s)t_{data}$. With the delay constraint, the route discovery time at each sender may be given by $$T_{wait} = \min\{\tau_{wait}, T_{wait}^{opt}\}. \quad (10)$$

The sender may preferably stop continuing to wait at $T_{wait}$ if there is an available relay candidate. If there is no available relay candidate, the sender may continue to wait until the first candidate wakes up or $T_{route}$, where $T_{route}$ is the time at which the sender declares route discovery failure.

Since $E_r^P(s)$ depends on so many independent random variables, such as waiting delays, transmission powers, link qualities, relay selection results, and so on, it may be speculated that it approximately follows the normal distribution $N(\mu, \sigma^2)$. This speculation is inspired by Lyapunov's central limit theorem and verified by the simulation results discussed below. The distribution of $E_r^P(s)$ may be estimated by the maximum likelihood approach. If there is a sample observation, $(e_r^P(s)_1, e_r^P(s)_2, \ldots, e_r^P(s)_n)$, where n is the sample size, the distribution parameters of F(.) may be estimated as $$\begin{cases} \hat{\mu} = \frac{1}{n}\sum_{i=1}^{n} e_r^p(s)_i, \\ \hat{\sigma}^2 = \frac{1}{n}\sum_{i=1}^{n} (e_r^p(s)_i - \hat{\mu})^2. \end{cases}$$

IV. Optimal Sleep/Wake Schedule

The optimal stopping time for each sender described above may be derived based on the known sleep interval parameters of its relay candidates. Since $t_{check}$ may be a constant period, $\lambda s$ determines the duty cycle of a node and should be selected carefully. If a sleep interval is relatively longer, a node may wake up less frequently and consume less energy, but other nodes that may potentially select it as a relay may end up waiting longer for the node to wake up, incurring more waiting energy consumption. Furthermore, nodes closer to a static sink may relay more packets and consume energy more quickly. This energy imbalance among nodes may speed up the network partition and shorten the network lifetime. Finally, the sleep interval determination of each node may also depend on the global delay constraint. Given these considerations, energy consumption may be balanced and the network lifetime may be maximized, subject to a constraint on the source-to-sink delay, by assigning an optimal sleep interval to each node according to its unique data traffic.

In one embodiment, all nodes may be assumed to be uniformly distributed over the whole monitoring area and generate data reports with the same average interval. Thus, the traffic load of each node mainly depends on its distance to the sink. The sleep interval for each node may be determined based on its hop count to the sink. For simplicity and without loss of generality, in this embodiment, the static sink may be located at the center of a circular monitoring area. The sleep interval parameter of a node may be denoted by $ks_h$, where h is the hop count of node and $1 \leq h \leq H$. Generally, inner nodes may wake up less frequently than outer nodes, namely, $\lambda s_1 < \lambda s_2 < \ldots < \lambda s_H$. As a consequence, packets may be forwarded quickly among outer nodes and then slowly among inner nodes, subject to the constraint on the source-to-sink delay.

When there is no packet to send, a node may alternate between waking up to check for a relay request and going to sleep. The power consumed by the sleep/wake schedule may be given by $$P_{schedule}(h) = \frac{P_{check}^{avg} t_{check} + P_{sleep}\lambda_{s_h}^{-1}}{t_{check} + \lambda_{s_h}^{-1}},$$

where $P_{check}^{avg}$ is the average power during the checking period and $P_{sleep}$ is the power during the sleep period. Usually, $\lambda_{s_h}^{-1}$ may be much longer than $t_{check}$ and the following approximate expression may be obtained:

$$P_{schedule}(h) \approx P_{check}^{avg} t_{check} \lambda_{s_h} + P_{sleep}.$$

For simplicity, a non-sender node may successfully broadcast a NOT packet during each checking period. Then, $P_{check}^{avg}$ may be approximated as $(P_{NOT}t_{NOT} + P_{idle}(t_{check} - t_{NOT}))/t_{check}$, where $P_{NOT}$ and $t_{NOT}$ are the power level and time needed by transmitting a NOT packet, respectively. $P_{NOT}$ may be fixed to get a relatively stable network topology.

Each node may generate a data packet with the same average interval, $\lambda_e^{-1}$. Since the relay selection result substantially depends on the random waking-up order of candidates, it may be assumed that nodes that have the same hop count evenly share the task of relaying packets generated by outer nodes (relative to the nodes with the same hop count). In addition, it may be assumed that F(.) of senders that have the same hop count follow a similar distribution, where the distribution function is denoted by Fh(.). Results in the simulation experiment discussed below support this assumption. The total number of nodes in the whole network whose hop counts are h may be denoted by $N_h$. Thus, each node may forward $N_f = \lambda_e \sum_{i=h}^{H} N_i/N_h$ packets per unit time on average. It may be assumed that each node consumes the same power, $P_{tx-rx}^{avg}$, when transmitting and receiving a packet, which is estimated by Eq. (1) above, using the average transmission power $P_{tx}^{avg}$ and the average transmission times $N_{tx}^{avg}$, both of which only depend on node density. Thus, the power consumption of a node incurred by forwarding a packet to the next hop, denoted by $P_{forward}(h)$, may approximately be given by $$\begin{cases} P_{tx-rx}^{avg} t_{data} \cdot \lambda_e \cdot \sum_{i=h}^{H} \frac{N_i}{N_h} & h = 1 \\ \left(\frac{P_{wait}}{N\lambda_{s_{h-1}} F_h(\xi)} + P_{tx-rx}^{avg} t_{data}\right) \cdot \lambda_e \cdot \sum_{i=h}^{H} \frac{N_i}{N_h} & 1 < h < H \\ \left(\frac{P_{wait}}{N\lambda_{s_{h-1}} F_h(\xi)} + P_{tx}^{avg} t_{data}\right) \cdot \lambda_e & h = H \end{cases}$$

In this embodiment, the waiting cost incurred by channel contention and queuing is not included, as mentioned above. Also, neighbors of the sink (h=1) may have no waiting cost since the sink is always active, and farthest nodes (h=H) usually have no receiving cost. Additionally, although it may be possible to reduce waiting cost when there are multiple pending packets in a transmit buffer, where subsequent packets can be transmitted to receiver directly following the first packet, the energy that potentially may be saved by this opportunistic aggregation is ignored. Finally, it may reasonably be assumed that data packets only have several kinds of fixed sizes and the distribution of packet size may be known in advance. Under these circumstances, the average value of $t_{data}$ may be used in the optimization that follows below.

With the delay upper bound constraint, the sleep interval optimization problem may be formulated as follows:

(P1) $\min\limits_{h} \max P_{total}(h)$ subject to $\sum_{h=2}^{H} \frac{1}{N\lambda_{s_{h-1}} F_h(\xi)} + H \cdot N_{tx}^{avr} \cdot t_{data} \leq \tau,$ $P_{total}(h) = P_{schedule}(h) + P_{forward}(h),$ $h \in \mathcal{N}, 1 \leq h \leq H.$ If $\vec{\lambda}_{s_h}$ is the solution to problem (P1), where $P_{total}(h_m) = \max\{\vec{P}_{total}(h)\}$, there always exists another solution $\vec{\lambda}_{s_h}^* \leq \vec{\lambda}_{s_h}$, where $\vec{P}_{total}(h)^* = \{P_{total}(h) = P_{total}(h_m)\}$, $\{1 \leq h \leq H\}$. Increasing $\vec{\lambda}_{sh}$ (except $\lambda_{s_{h_m}}$) and getting $\vec{\lambda}_{sh}$ lets $\vec{P}_{total}(h)^* = \{P_{total}(h) = P_{total}(h_m)\}$, $1 \leq h \leq H\}$. Since $\vec{\lambda}_{s_h}^* \leq \vec{\lambda}_{s_h}$, if $\vec{\lambda}_{s_h}$ meets the delay requirement, so does $\vec{\lambda}_{s_h}^*$. Thus, $\vec{\lambda}_{s_h}^*$ may also a solution to problem (P1).

Problem (P1) may then be simplified into the following problem, (P2) min $P_{total}$ subject to $\sum_{h=2}^{H} \frac{1}{N\lambda_{s_{h-1}} F_h(\xi)} + H \cdot N_{tx}^{avr} \cdot t_{data} \leq \tau,$ $P_{total}(h) = P_{total},$ $h \in \mathcal{N}, 1 \leq h \leq H.$ Finally, an efficient searching algorithm may be developed for problem (P2). The iteration starts from $\lambda_{s_1}=\lambda_{initial}$. Other nodes may compute corresponding sleep parameters $\lambda_{s_h}$ successively, subject to the constraint $P_{total}(h)=P_{total}$. Then, the delay constraint may be checked. If the expected delay exceeds the upper bound by too much (e.g. 50%), the algorithm may increase $\lambda s_1$ and continue the iteration. If the upper bound exceeds the expected delay too much (e.g. 50%), the algorithm may decrease $\lambda s_1$ and continue the iteration. Otherwise, the iteration may end with optimal sleep interval parameters.

V. Simulation

The performance of particular embodiments of the present invention was evaluated using simulations. First, the distribution of forwarding energy consumption was determined and whether the F(.) of nodes with the same hop count followed a similar normal distribution was verified. Next, the effectiveness of the optimal stopping time disclosed in the present invention was demonstrated. Then, the superiority of the virtual coordinates and cross-layer forwarding strategy disclosed in the present invention was demonstrated by comparing the energy consumed by forwarding a packet via DCEER as disclosed herein with the energy consumed by forwarding a packet via AIMRP [15] and a combination of GPSR [7] and X-MAC [5]. Finally, the network lifetimes achieved under these three different routing protocols subject to a delay constraint was compared.

A. Parameter Setting

Simulation experiments were implemented based on NS-2 (Network Simulator 2) platform. In the experiments, all nodes were distributed uniformly in a circular monitoring area with a radius of 103 m and the sink was deployed at the center of the monitoring area. The node density was equal to $2*10^{-3}$ node/m$^2$. It was assumed that there were 26 available transmission output levels, from −25 dBm to 5 dBm. The specific output power levels and the corresponding factual power consumptions were taken from Chipcon Inc. CC1000 data sheet (available at http://www.chipcon.com), which is incorporated herein by reference in its entirety. The following parameters were also set: d0=1 m, PL(d0)=−35 dB, n=6.4, $\sigma=4$, $\lambda_\sigma^{-1}=7200$ s, and PN=−95 dBm (see [11]).

Other radio and network parameters are given by Table 2.

TABLE 2

| RADIO AND NETWORK PARAMETERS | | | | | |
|---|---|---|---|---|---|
| $P_{rx}$ | $P_{idle}$ | $P_{sleep}$ | $P_{max}$ | $P_{min}$ | $P_{NOT}$ |
| 28.8 mW | 28.8 mW | 0.28 mW | 76.2 mW | 25.8 mW | 50.4 mW |
| R | $t_{check}$ | $F_{NOT}$ | $F_{RR}$ | $F_{ARR}$ | $F_{ACK}$ |
| 250 bbps | 1 ms | 15 bytes | 9 bytes | 7 bytes | 5 bytes |

B. Simulation results

In one experiment, the assumption that $E_r^P(s)$ follows the normal distribution was verified, and the traffic load of nodes with the same hop count and their $E_r^P(s)$ distributions were compared. In this experiment, each node generated 1000 data reports with $\lambda e=10^{-3}$ s$^{-1}$ and each data report had a packet size of FDATA=$10^4$ bytes. The coordinate updating factor was set as a=0:2. The delay constraint and energy balance were temporarily not considered. When there was no data to send, each node woke up about once per 1 second ($\lambda s=1$ s$^{-1}$) Some nodes at each hop were randomly selected for observation, and during relay selection, each observation node recorded a sample upon receiving a NOT packet. For each node, 100 sample values were used to estimate the distribution parameters of F(.). Exemplary graphic results of h=5 and h=10 are exhibited.

Figure 6:
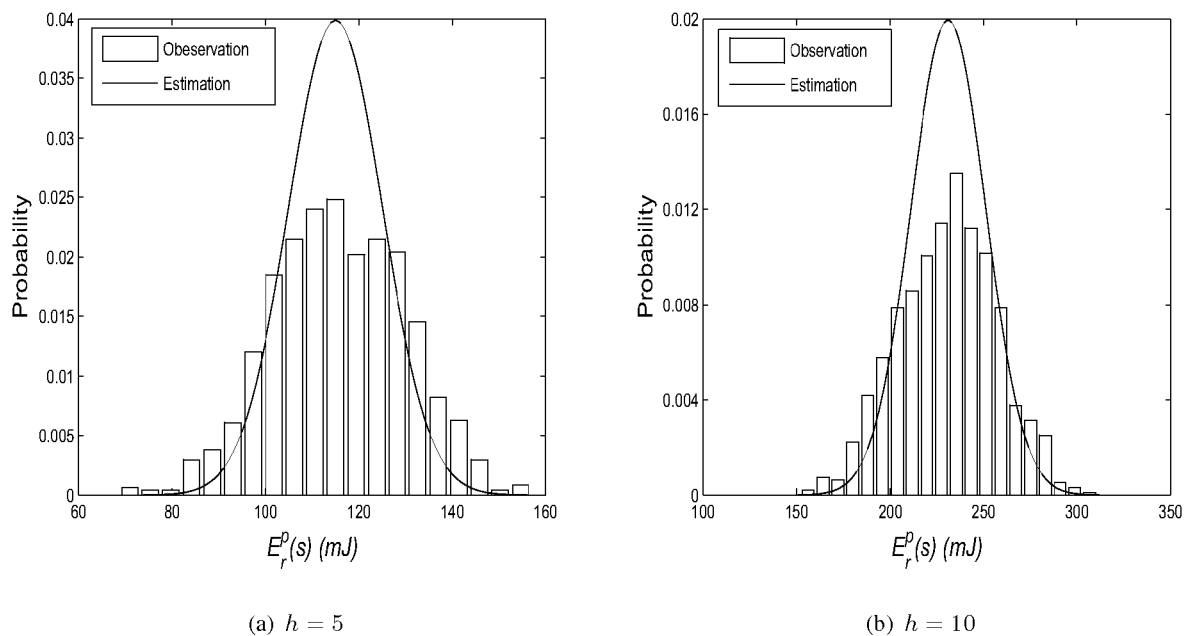
FIG. 6 depicts graphs illustrating the distribution of $E_r^p(s)$ based on hop count for an exemplary simulation of an embodiment of the described invention.

In FIG. 6, depicting graphs 600 of the distribution of $E_r^P(s)$ based on hop count, the curve line is the estimated probability density function of $E_r^P(s)$ based on 100 sample values and the histogram is the factual distribution of 10000 observation values. Results showed that $E_r^P(s)$ approximately followed the estimated normal distribution. It was also noted that the distribution estimation error decreased as the hop count increased. Then, 5 nodes having the same hop count (h=5) were randomly selected. The results are shown in Table 3 and indicate that these nodes relay a similar number of packets and their $E_r^P(s)$ follow the similar normal distribution. These results support the principle of optimizing the sleep interval of a node based on its hop count.

TABLE 3

| THE TRAFFIC AND DISTRIBUTION ESTIMATION AT HOP 5 | | | | | |
|---|---|---|---|---|---|
| Node | 1 | 2 | 3 | 4 | 5 |
| Traffic | 9275 | 9258 | 9289 | 9278 | 9310 |
| $\hat{\mu}, \hat{\sigma}^2$ | 115.6, 96.04 | 112.4, 84.64 | 113.7, 92.16 | 116.2, 79.21 | 113.9, 104.04 |

Figure 7:
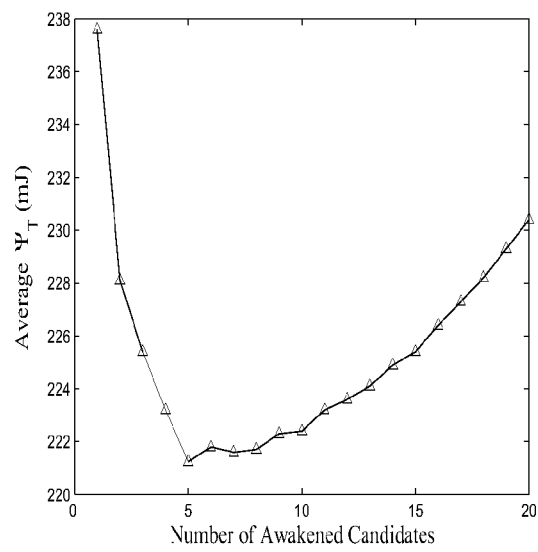
FIG. 7 depicts graphs illustrating the distribution of optimal stopping time for an exemplary simulation of an embodiment of the described invention.
Figure 7:
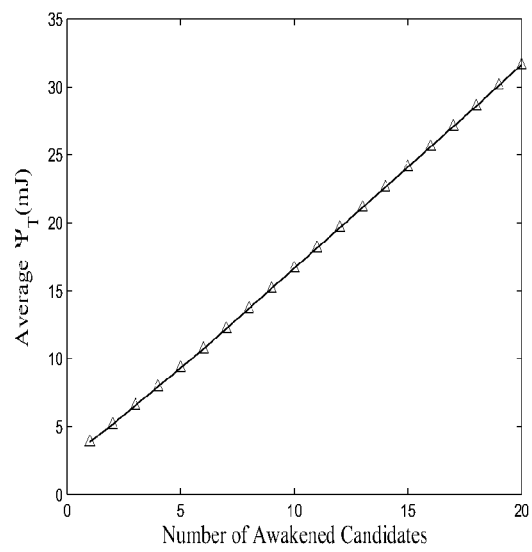

Then, the effectiveness of the optimal stopping time was demonstrated. Two scenarios were considered: $E_r^P(s)$ follows N(231.16, 324.25) and (2.32, 0.26), respectively. These two distributions were the samples of a node that was located at hop 10 when FDATA=$10^4$ bytes, $10^2$ bytes respectively. In FIG. 7, depicting graphs 700 that show the optimal stopping time, the x-value is the relay selection duration, in terms of the number of awakened candidates, and y-value is the average total energy consumption of 100 simulations. The optimal stopping time is indicated by the lowest point of each curve. In the large packet scenario, the optimal stopping time was the fifth candidate and the minimum total energy consumption is 220.50 mJ. At the beginning, X(t) is not low enough and $\psi_T$ decreases as the number of awakened candidates increases. After X(t) becomes low enough (lower than $\xi$), $\psi_T$ begins to increase due to insignificant decrementing of X(t) and high waiting energy cost. These two results closely agree with Eqs. 8 and 9 above ($1/F(\xi)$=4.64, $\xi$=220.06 mJ). In the small packet scenario, the optimal stopping time was the first candidate and the minimum total energy consumption is 3.7816 mJ. The decrement of X(t) brought by the next candidate is so insignificant when compared to the waiting energy consumption that each sender stops its relay selection as soon as possible to reduce the total energy consumption. These simulation results also closely agree with Eqs. 8 and 9 above ($1/F(\xi)$=1.00, $\xi$=3.87 mJ).

Figure 8:
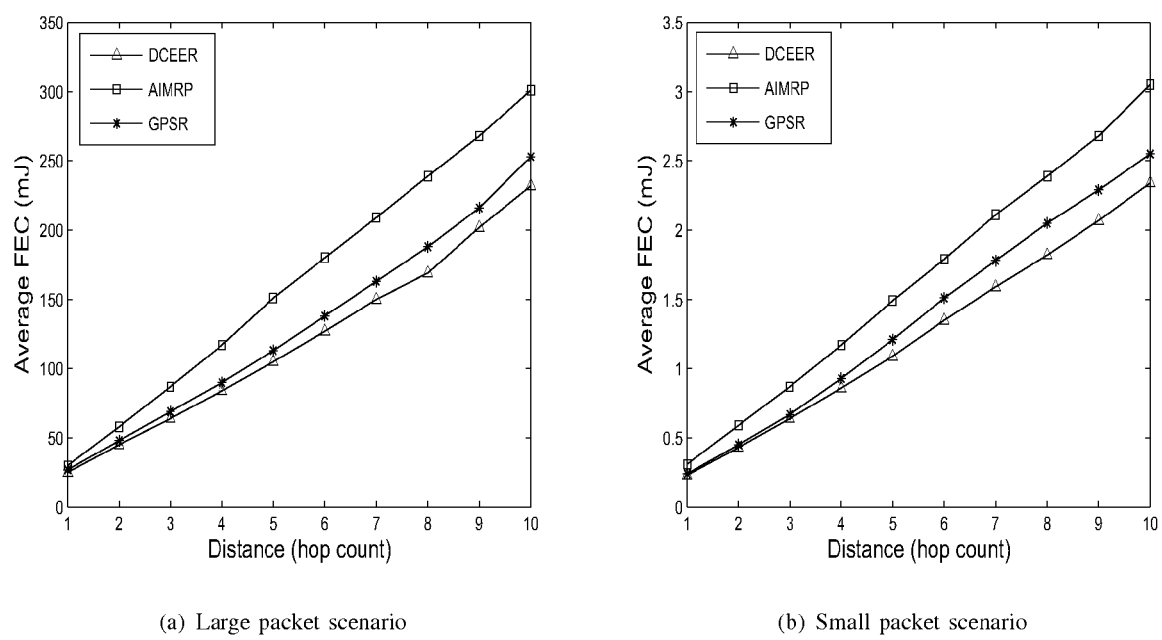
FIG. 8 depicts graphs illustrating the performance of different routing protocols in a large packet scenario and a small packet scenario with respect to forwarding energy consumed given no sleep/wake schedule for an exemplary simulation of an embodiment of the described invention.

Next, the advantages of power-based virtual coordinates and cross-layer forwarding strategy was evaluated. The total energy consumed by forwarding a packet to the sink using the DCEER disclosed herein was compared to the total energy consumed using AIMRP and GPSR, where the delay constraint and energy balance were temporarily not taken into account. In AIMRP, the sender selects the first candidate as the next-hop relay. In GPSR, the sender chooses the candidate that is geographically closest to the sink. AIMRP aims at reducing the waiting energy consumption while GPSR aims at reducing the forwarding energy cost based on geographic location knowledge. Senders in both AIMRP and GPSR adopt the constant transmission power, the same as PNOT. In a first sub-experiment, each node did not employ any sleep/wake schedule, so that there was no waiting energy consumption. As shown in FIG. 8, depicting graphs 800 of the performance of the different routing protocols in a large packet scenario and a small packet scenario with respect to forwarding energy consumed given no sleep/wake schedule, DCEER consumed less energy than AIMRP and GPSR. AIRMP consumed the most energy since it is aimed at reducing waiting energy consumption, regardless of the forwarding energy consumption. Though GPSR selects the candidate that is closest to the sink, such a local greedy strategy does not always find the optimal forwarding path in such a multi-hop and irregular communication environment. The energy savings attributed to DCEER mainly resulted from the use of an optimal transmission power at each hop and the help of virtual coordinates. The latter provides a more global view of network and helps avoid lossy links.

Figure 9:
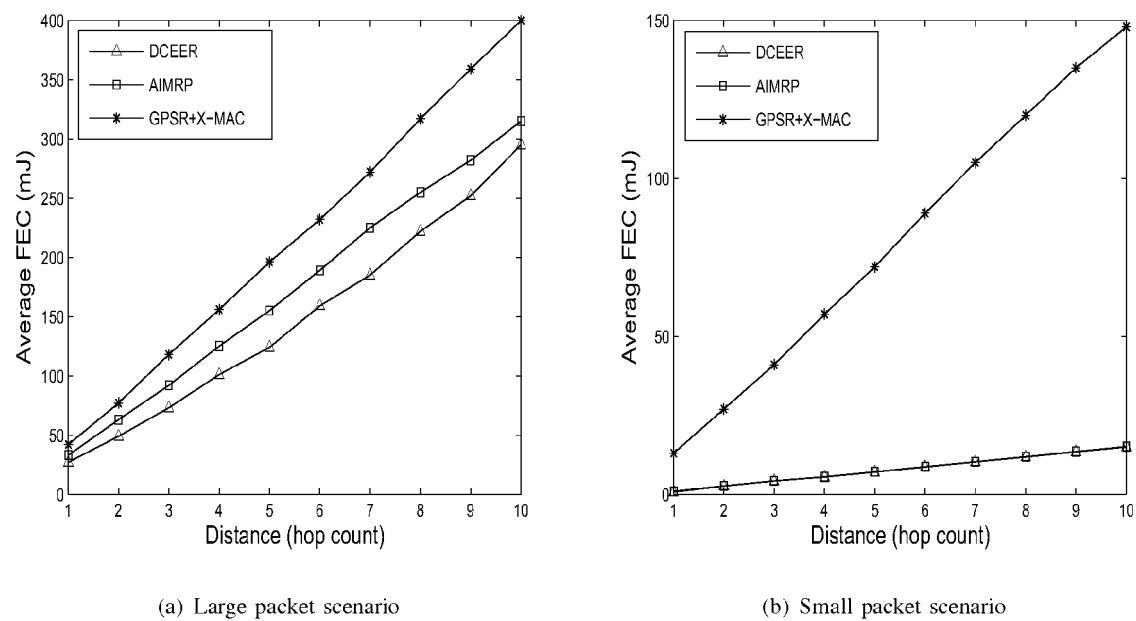
FIG. 9 depicts graphs illustrating the performance of different routing protocols in a large packet scenario and a small packet scenario with respect to forwarding energy consumed given a sleep/wake schedule where nodes wake up about once in 1 second for an exemplary simulation of an embodiment of the described invention.

In a second sub-experiment, each node woke up about once in 1 second on average. GPSR used X-MAC to operate its asynchronous sleep/wake schedule. Results in FIG. 9, depicting graphs 900 of the performance of different routing protocols in a large packet scenario and a small packet scenario with respect to forwarding energy consumed given a sleep/wake schedule where nodes wake up about once in 1 second, show that AIMRP outperformed the combination of GPSR and X-MAC in both scenarios after introducing an asynchronous sleep/wake schedule, since each sender under the combination of GPSR and X-MAC had to wait for 0.5 second on average, which consumed too much energy. However, the combination of GPSR and X-MAC may outperform AIMRP when the network transfers larger data packets or nodes wake up more frequently. Furthermore, as shown in FIG. 9, in addition to the advantages shown in FIG. 8, the optimal cross-layer relay selection scheme helped DCEER reduce the total energy consumption. DCEER outperformed both AIMRP and the combination of GPSR and X-MAC in the large packet scenario and achieved the same performance as AIMRP in the small packet scenario.

Finally, the network lifetimes of three protocols (DCEER, AIMRP, and the combination of GPSR and X-MAC) were compared given a source-to-sink delay upper bound. The lifetime was defined as the time when the first node runs out of energy. In this experiment, two scenarious were considered, where FDATA=$10^4$ bytes, $10^2$ bytes. In the large packet scenario, each node had an initial energy of 10 J and the delay upper bound was set to 5 s. In the small packet scenario, each node had an initial energy 1 J, the delay upper bound was set to 1 s. To guarantee performance, the protocols set the sleep interval parameters under the premise that they can forward packets before the maximum allowable delay. In AIMRP, the sleep interval was maximized since it is only concerned about the energy consumed by sleep/wake schedule. Thus, in two scenarios, $\lambda_s^{-1}$ of each node was 2.581 s and 1.388 s, respectively. In the combination of GPSR and X-MAC, the sleep interval was at most two times of the allowable link delay. Thus, $\lambda_s^{-1}$ of each node was 0.20 s and 0.36 s. In DCEER, the sleep intervals were computed by Algorithm 1. The results of the two scenarios are given in Table 4 and Table 5.

---

Algorithm 1: Computing optimal sleep intervals

---

Input: $\tau$, N, H, $t_{data}$, $\epsilon$, $\lambda_e$
Output: $\lambda_{s_h}$
$\lambda_{s_1} = \lambda_{initial}$;
last_entrance = 0;
while true do
$\quad$ $P_{total} = P_{total}(1)$;
$\quad$ for h = 2; h ≤ H; h ++ do
$\quad\quad$ estimate $F_h(\cdot)$ and compute $F_h(\xi)$;
$\quad\quad$ $\lambda_{s_h} = \inf\{P_{total}(h) = P_{total}\}$;
$\quad$ end $\quad$ $D_{max} = \sum_{h=2}^{H} \frac{1}{N\lambda_{s_{h-1}}F_h(\xi)} + HN_{tx}^{avr}t_{data}$;

$\quad$ if ($D_{max} > \tau + \epsilon$) then
$\quad\quad$ if last_entrance == 2 then
$\quad\quad\quad$ $t_\Delta = t_\Delta/2$;
$\quad\quad$ end
$\quad\quad$ $\lambda_{s_1}^{-1} = \lambda_{s_1}^{-1} - t_\Delta$;
$\quad\quad$ last_entrance = 1;
$\quad\quad$ continue;
$\quad$ end
$\quad$ else if ($D_{max} < \tau - \epsilon$) then
$\quad\quad$ if last_entrance == 1 then
$\quad\quad\quad$ $t_\Delta = t_\Delta/2$;
$\quad\quad$ end
$\quad\quad$ $\lambda_{s_1}^{-1} = \lambda_{s_1}^{-1} + t_\Delta$;
$\quad\quad$ last_entrance = 2;
$\quad\quad$ continue;
$\quad$ end
$\quad$ else
$\quad\quad$ break;
$\quad$ end
end
return $\lambda_{s_h}$;

TABLE 4

Theoretical Results for the Large Packet Scenario

| | h | | | | | | | | | |
|---|---|---|---|---|---|---|---|---|---|---|
| | 1 | 2 | 3 | 4 | 5 | 6 | 7 | 8 | 9 | 10 |
| $F_h(\xi)$ | 0 | 0.83 | 0.73 | 0.64 | 0.59 | 0.55 | 0.50 | 0.41 | 0.36 | 0.27 |
| $\lambda_{sh}^{-1}$ | 8.094 | 4.453 | 0.027 | 0.018 | 0.018 | 0.018 | 0.017 | 0.017 | 0.017 | 0.017 |
| $P_{total}$ | | | | | 2.63 mW | | | | | |

TABLE 5

Theoretical Results for the Small Packet Scenario

| | h | | | | | | | | | |
|---|---|---|---|---|---|---|---|---|---|---|
| | 1 | 2 | 3 | 4 | 5 | 6 | 7 | 8 | 9 | 10 |
| $F_h(\xi)$ | 0 | 0.998 | 0.997 | 0.996 | 0.997 | 0.995 | 0.992 | 0.993 | 0.989 | 0.992 |
| $\lambda_{sh}^{-1}$ | 0.396 | 0.945 | 1.674 | 2.655 | 3.973 | 2.443 | 0.504 | 0.339 | 0.328 | 0.324 |
| $P_{total}$ | | | | | 0.40 mW | | | | | |

Figure 10:
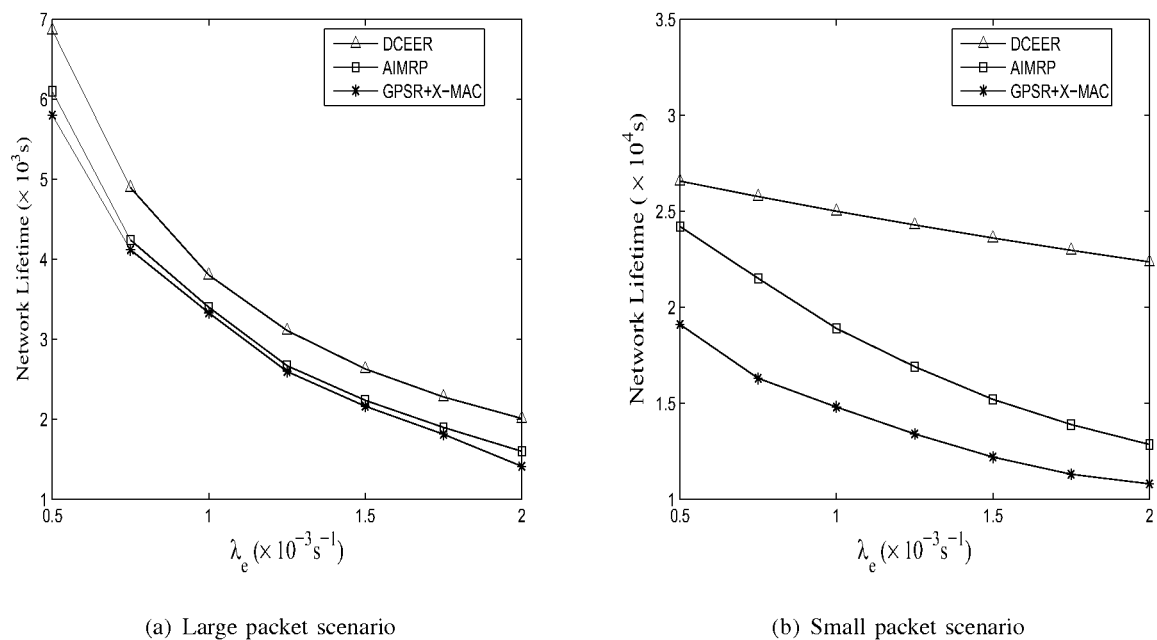
FIG. 10 depicts graphs illustrating the performance of different routing protocols in a large packet scenario and a small packet scenario with respect to network lifetime for an exemplary simulation of an embodiment of the described invention.

In the large packet scenario, inner nodes wake up much less frequently than outer nodes to achieve energy balance since $P_{forward}(h)$ has greater weight. The estimated total power of each node is 2.63 mW. In the small packet scenario, the estimated total power of each node is 0.40 mW. The simulation results of network lifetime when $\lambda e$ varies from $0.5*10^{-3}$ to $2*10^{-3}$ are shown in FIG. 10, depicting graphs 1000 of the performance of different routing protocols in a large packet scenario and a small packet scenario with respect to network lifetime. In the large packet scenario, the lifetimes of three networks decreased dramatically as the traffic load increased, due to the large data packets. But in the small scenario, the lifetimes decreased less dramatically. In general, DCEER survived longer than AIMRP and the combination of GPSR and X-MAC in both scenarios under the same delay constraint.

VI. Conclusion

From this description, it will be appreciated that the disclosed principles provide system and method for employing cross-layer techniques to improve the performance of online forwarding when using an asynchronous MAC protocol. At each hop, the next-hop relay may be decided dynamically during the period of waiting for neighbors to wake up. The waiting cost of selecting an efficient relay may be minimized by stopping the relay selection process at an optimal stopping time, and the sleep interval of each node may be optimized to minimize the power consumption according to the traffic load. The disclosed DCEER makes a good tradeoff between energy-efficiency and delay under the asynchronous sleep/wake schedule scenario. Furthermore, theoretical analysis and extensive simulations have shown that DCEER consumes less energy under the same delay constraint than existing solutions.

It will also be appreciated, however, that the described systems, methods and embodiments are merely examples of the inventive principles, and that these illustrate only preferred techniques. It is contemplated that other embodiments of the invention may differ in detail from the foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for routing data packets in an event-driven and delay-constrained wireless sensor network (WSN) including a plurality of nodes, the method comprising:
   receiving, at a first node, a data packet;
   waiting for at least one potential next-hop relay node to wake up;
   determining whether a potential next-hop relay node that wakes up is a current-best next-hop candidate; and
   forwarding the data packet to the current-best next-hop candidate after a relay-selection stopping time, wherein the relay-selection stopping time is based on an estimation of a forwarding energy consumption (FEC) that would be incurred by forwarding the data packet through the current-best next-hop candidate and an expected waiting cost that would be incurred by waiting for at least one additional potential next-hop relay node to wake up;
   wherein the relay-selection stopping time is further based on an end-to-end delay constraint.

2. The method according to claim 1, wherein the first node is associated with a virtual coordinate, wherein the virtual coordinate includes information relating to the forwarding costs associated with the first node; and
   wherein the information relating to the forwarding costs associated with the first node comprises a total expected number of transmissions, a total expected transmitting-receiving power consumption and a total expected waiting delay.

3. The method according to claim 2, wherein the virtual coordinate associated with the first node is updated after the data packet is forwarded to the next-hop relay node to include information relating to the forwarding costs associated with the forwarding of the data packet.

4. The method of claim 1, wherein the waiting for at least one potential next-hop relay node to wake up further comprises:
   listening for at least one notification packet sent from the at least one potential next-hop relay node when the at least one potential next-hop relay node wakes up.

5. The method of claim 1, wherein determining whether a potential next-hop relay node that wakes up is a current-best next-hop candidate further comprises:
   comparing the estimated FEC of the potential next-hop relay with a previously determined current-best next-hop candidate; and
   transmitting at least one relay request (RR) packet if the estimated FEC of the at least one potential next-hop relay is lower than the estimated FEC of the previously determined current-best next hop candidate, wherein the at least one RR packet includes a node ID (identifier) of the potential next-hop relay.

6. The method of claim 1, wherein forwarding the data packet to the current-best next-hop candidate after a relay-selection stopping time further comprises:
   sending the data packet to the current-best next-hop candidate; and
   receiving an acknowledgement packet from the current-best next-hop candidate after the data packet has been sent.

7. The method of claim 1, further comprising:
   determining the relay-selection stopping time, wherein determination of the relay-selection stopping time includes comparing a difference between the estimated FEC of the current-best next-hop candidate and an expected FEC of the at least one additional potential next-hop relay node with the expected waiting cost that would be incurred by waiting for the at least one additional potential next-hop relay node to wake up.

8. The method of claim 1, wherein the first node resends a packet when a packet is lost.

9. The method of claim 1, the method further comprising:
   if no current-best next-hop candidate is determined before the relay-selection stopping time, forwarding the data packet to the current-best next-hop candidate comprises forwarding the data packet to the first potential next-hop relay node that wakes up.

10. The method of claim 1, the method further comprising:
    if no potential next-hop relay nodes wake up before a predetermined time, forwarding the data packet to the current-best next-hop candidate comprises forwarding the data packet to a node that had previously forwarded the data packet to the first node.

11. The method of claim 1, wherein the at least one potential next-hop relay node sleeps and wakes up according to a predetermined sleep/wake schedule, wherein the predetermined sleep/wake schedule is based on a hop count associated with the node.

12. A non-transient tangible computer-readable medium, part of a sensor node in a wireless sensor network including a plurality of sensor nodes, the computer-readable medium comprising:
    instructions for waiting for at least one potential next-hop relay node to wake up when the sensor node is holding a data packet to send;
    instructions for determining whether a potential next-hop relay node that wakes up is a current-best next-hop candidate;
    instructions for forwarding the data packet to the current-best next-hop candidate after a relay-selection stopping time, wherein the relay-selection stopping time is based on an estimation of a forwarding energy consumption (FEC) that would be incurred by forwarding the data packet through the current-best next-hop candidate and an expected waiting cost that would be incurred by waiting for at least one additional potential next-hop relay node to wake up; and
    instructions for updating a virtual coordinate associated with the sensor node after forwarding a data packet, wherein the virtual coordinate includes information relating to a total expected number of transmissions, a total expected transmitting-receiving power consumption and a total expected waiting delay.

13. The computer-readable medium of claim 12, further comprising:
    instructions for comparing the estimated FEC of the potential next-hop relay with a previously determined current-best next-hop candidate; and
    instructions for transmitting at least one relay request (RR) packet if the estimated FEC of the potential next-hop relay is lower than the estimated FEC of the previously determined current-best next hop candidate, wherein the at least one RR packet includes a node ID (identifier) of the potential next-hop relay.

14. The computer-readable medium of claim 12, further comprising:
    instructions for sleeping and waking according to a sleep/wake schedule when not holding a packet to send, wherein the sleep/wake schedule is based on a hop count associated with the node.

15. A method for routing data packets in an event-driven and delay-constrained wireless sensor network (WSN) including a plurality of nodes, the method comprising:
- receiving, at a first node, a data packet;
- waiting for at least one potential next-hop relay node to wake up;
- determining whether a potential next-hop relay node that wakes up is a current-best next-hop candidate; and
- forwarding the data packet to the current-best next-hop candidate after a relay-selection stopping time,
- wherein the relay-selection stopping time is based on an estimation of a forwarding energy consumption (FEC) that would be incurred by forwarding the data packet through the current-best next-hop candidate and an expected waiting cost that would be incurred by waiting for at least one additional potential next-hop relay node to wake up;
- wherein the first node is associated with a virtual coordinate, the virtual coordinate including information relating to the forwarding costs associated with the first node; and
- wherein the information relating to the forwarding costs associated with the first node comprises a total expected number of transmissions, a total expected transmitting-receiving power consumption and a total expected waiting delay.

16. The method of claim 15, wherein the relay-selection stopping time is further based on an end-to-end delay constraint.

17. The method of claim 15, further comprising:
- determining the relay-selection stopping time, wherein determination of the relay-selection stopping time includes comparing a difference between the estimated FEC of the current-best next-hop candidate and an expected FEC of the at least one additional potential next-hop relay node with the expected waiting cost that would be incurred by waiting for the at least one additional potential next-hop relay node to wake up.

18. A non-transient computer-readable medium, part of a first node in an event-driven and delay-constrained wireless sensor network (WSN) including a plurality of nodes, having computer-executable instructions stored thereon for forwarding data packets, the computer-executable instructions comprising instructions for:
- receiving a data packet;
- waiting for at least one potential next-hop relay node to wake up;
- determining whether a potential next-hop relay node that wakes up is a current-best next-hop candidate; and
- forwarding the data packet to the current-best next-hop candidate after a relay-selection stopping time, wherein the relay-selection stopping time is based on an estimation of a forwarding energy consumption (FEC) that would be incurred by forwarding the data packet through the current-best next-hop candidate and an expected waiting cost that would be incurred by waiting for at least one additional potential next-hop relay node to wake up;
- wherein the relay-selection stopping time is further based on an end-to-end delay constraint.

19. The non-transient computer-readable medium of claim 18, wherein the first node is associated with a virtual coordinate, wherein the virtual coordinate includes information relating to the forwarding costs associated with the first node; and
- wherein the information relating to the forwarding costs associated with the first node comprises a total expected number of transmissions, a total expected transmitting-receiving power consumption and a total expected waiting delay.

20. The non-transient computer-readable medium of claim 18, wherein the computer-executable instructions further comprise instructions for:
- determining the relay-selection stopping time, wherein determination of the relay-selection stopping time includes comparing a difference between the estimated FEC of the current-best next-hop candidate and an expected FEC of the at least one additional potential next-hop relay node with the expected waiting cost that would be incurred by waiting for the at least one additional potential next-hop relay node to wake up.

* * * * *